United States Patent [19]

Lundgren

[11] Patent Number: 4,557,652
[45] Date of Patent: Dec. 10, 1985

[54] LOCKABLE NUT

[75] Inventor: Bengt Lundgren, Lerum, Sweden

[73] Assignee: SKF Nova AB, Goteborg, Sweden

[21] Appl. No.: 554,902

[22] Filed: Nov. 25, 1983

[30] Foreign Application Priority Data

Feb. 2, 1983 [SE] Sweden .................. 8300542

[51] Int. Cl.[4] ............................................. F16B 39/28
[52] U.S. Cl. .................... 411/230; 411/291; 411/433; 411/936
[58] Field of Search ............... 411/230, 231, 274, 275, 411/290, 291, 432, 433, 288, 289, 286, 222–229, 936

[56] References Cited

U.S. PATENT DOCUMENTS

| 171,898 | 1/1876 | Wiles | 411/291 |
| 518,474 | 4/1894 | Wallace | 411/230 |
| 1,850,917 | 3/1932 | Browne | 411/275 |
| 3,038,366 | 6/1962 | Hindman | 411/433 |

FOREIGN PATENT DOCUMENTS

| 1206230 | 8/1959 | France | 411/433 |
| 524399 | 8/1940 | United Kingdom | 411/433 |

Primary Examiner—Robert L. Wolfe
Assistant Examiner—Neill Wilson
Attorney, Agent, or Firm—Eugene E. Renz, Jr.

[57] ABSTRACT

A nut which is lockable on a threaded element comprises two annular parts (1, 2) connected by preferably resilient members (5). Locking takes place by tightening a screw (6) arranged in a threaded bore in one nut part and abutting against the other nut part. During tightening of the screw, the parts (1, 2) are displaced and/or skewed in relation to each other whereby locking takes place on the thread.

9 Claims, 6 Drawing Figures

LOCKABLE NUT

FIELD OF THE INVENTION

The invention relates to a nut which is lockable on a threaded element.

BACKGROUND OF THE INVENTION

It is known in the art to lock a nut in a screw and nut joint, e.g., by using another nut which is tightened against the nut to be locked, or by using a nut made in two parts each with a threaded portion and being rotatable in relation to each other. Such locking devices generally consist of a plurality of loose parts and are, therefore, complicated to handle. Further, a locking nut or nut part has to be tightened forcefully against the nut or nut part which constitutes the active part of the screw and nut joint, which makes it difficult to determine the exact position of the last mentioned element on the thread, or the pre-stress of the screw and nut joint, because the locking nut or nut part acts with a torque on the other nut or nut part when it is being tightened, causing said other nut or nut part to be turned so that its position on the thread or its pre-stressing force against a supporting surface is changed during the locking operation.

It is also known to make a nut lockable by providing it with a slot in a plane perpendicular to the thread and through a portion of it and varying the width of the slot, thereby causing a clamping action in a portion of the nut thread by means of an axially arranged screw which extends through the slot. Such a nut has to be comparatively thick in order to provide a space for the slot, and making such a slot in the nut is expensive and complicated.

SUMMARY OF THE INVENTION

The object of the present invention is to provide a lockable nut which is inexpensive to produce and easy to handle and which can be easily and efficiently locked in any position on a threaded element. This is achieved according to the invention by giving the nut the characterizing features which are stated in claim 1.

Such a nut consists of parts which are easily produced and assembled, and a complete nut is small and handy and makes up a self-contained unit. It can be accurately locked in the desired position on a thread and its tightening force against a supporting surface is not altered during the locking operation.

DESCRIPTION OF THE DRAWINGS

The following is a detailed description of the invention with reference to the accompanying drawing, in which.

DESCRIPTION OF THE PREFERRED EMBODIMENTS

Figure 1:
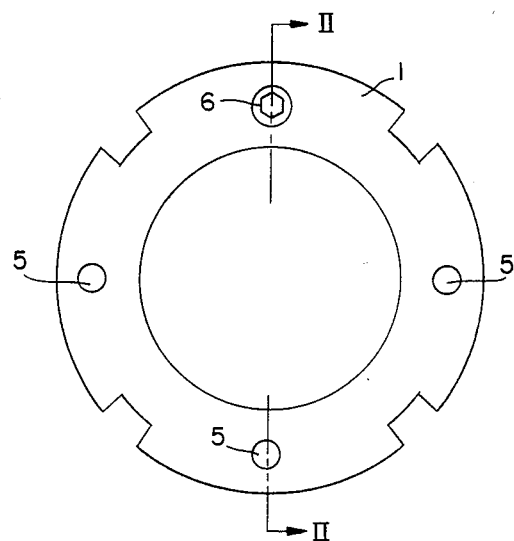
FIG. 1 shows a view of a nut according to one embodiment of the invention.
Figure 2:
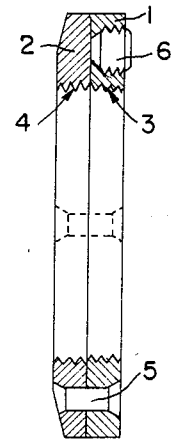
FIG. 2 shows a section according to II—II in FIG. 1 of the nut.

As appears from FIGS. 1 and 2, the nut comprises two coaxial annular parts, 1, 2 each provided with a threaded portion 3, 4 arranged for co-operation with the thread of a screw, not shown, on which the nut is adapted to fit. The parts 1 and 2 are connected to each other with members 5 which allow relative axial displacement and/or skewing of the parts 1, 2 without relative rotation at the same time. Members 5 consist in this embodiment of plugs of synthetic resin or rubber which are arranged in bores in parts 1, 2, keeping the parts close together with a certain elastic pre-stress. A locking screw 6 is arranged in a threaded axial bore in part 1 and abuts with its end against part 2.

The nut is suitably made such that the parts 1 and 2, which preferably are identical sheet metal washers, are connected by placing the members 5 in the bores made for this purpose in the respective parts, whereafter the thread, 3, 4 is made in a final operation in connection to the making of the thread for the screw 6.

When the nut is to be locked on the thread, not shown, after having been screwed into a desired position, e.g., into contact with a desired force against a supporting surface on an element which is to be secured with the screw and nut joint in question, the screw 6 is tightened against the nut part 2 so that the parts 1 and 2 are pushed apart in the area in which the screw 6 is situated, whereby at least one of the thread portions 3 and 4 is squeezed upon the surrounded thread and locks the nut in its position. If only one or a pair of assymetrically placed locking screws are used, the nut parts 1, 2 are skewed in relation to each other during the locking operation, which gives a considerably better locking effect than what would be the case if a number of locking screws were placed so that the nut parts 1, 2 were only displaced axially in relation to each other when the screws were tightened.

When the screw 6 is released, the nut parts 1, 2 resume their original relative positions due to the resiliency of the connecting members 5, whereafter the nut can be easily rotated on the thread, not shown.

Figure 3:
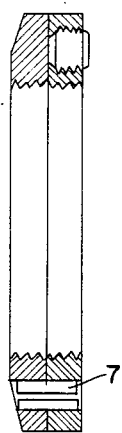
FIGS. 3-6 show sections of nuts according to other embodiments of the invention.

FIG. 3 shows an embodiment in which the nut parts are connected by guiding pins 7 arranged in bores in the nut parts. The pins prevent accidental relative rotation of the nut parts. They may, e.g., be vulcanized in rubber bushings in the bores in order to achieve the desired resiliency of the joint.

Figure 4:
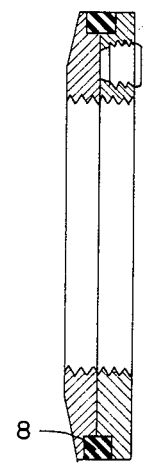

FIG. 4 shows how the nut parts can be connected by an elastic ring, e.g., a vulcanized rubber ring arranged around the periphery of the respective nut parts. Such a ring also acts as a seal and prevents ingress of, e.g., water or contamination in the slot between the nut parts.

Figure 5:
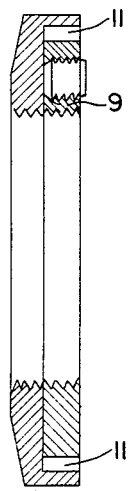

FIG. 5 shows how one nut part 9 can be arranged in an axially directed recess in the other nut part 10. The parts can be connected by, e.g., a number of pins 11 arranged in complementary semi-cylindrical bores in the respective nut parts. Such an embodiment gives an undivided envelope surface of the nut.

Figure 6:
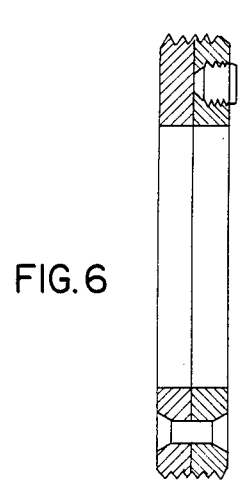

FIG. 6 shows that also a nut with external threads can be made according to the invention and locked into a threaded bore.

What is claimed is:

1. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces including at least one plug member made of rubber snugly engaging in axially aligned, circumferentially spaced openings in the nut members maintaining the nut members in side-by-side contacting array with a predetermined elastic prestress, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element.

2. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element, said nut members comprising identical sheet metal washers first connected by plug members forming the resilient elastic means and wherein the thread is formed in the members so connected.

3. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces, comprising a series of pins arranged in axially aligned bores in said nut members, said pins being vulcanized rubber bushings in said bores to provide a resilient joint, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element.

4. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces, including said elastic resilient means connecting said nut members comprising an elastic rubber ring tightly seated in a groove formed in the outer periphery of said nut members adjacent confronting axial end faces of said nut members, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element.

5. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element, one of said nut members having a circumferentially extending flange projecting from one axial end face forming a pocket for the other nut member and means for at least one complementary semi-cylindrical bore in the inner peripheral surface of said flange and outer peripheral surface of said other nut member for a pin made of a resilient elastic material providing an individual continuous envelope surface for the lock nut assembly.

6. A lock nut assembly adapted to be locked on a threaded element comprising at least a pair of coaxially oriented annular nut members having threads formed on their peripheral surfaces complementing and cooperable with the threaded element, resilient elastic means connecting said annular members and normally maintaining them in abutting relation at their axial end faces with a predetermined prestressing force, said elastic resilient means permitting limited axial displacement of said annular members and restricting relative rotation thereof, and normally permitting free rotation of said annular members as a unit relative to the threaded element and screw actuator means for displacing said annular members axially relative to one another thereby to lock said annular members to the threaded element and wherein upon release of said actuator means said resilient elastic means urges said annular members to the axially abutting relation permitting rotation of said annular elements as a unit relative to the threaded element.

7. A lock nut assembly as claimed in claim 6 wherein said connecting means comprises at least one plug member snugly engaging in axially aligned openings in the nut members maintaining the nut members in side-by-side contacting array with a predetermined elastic prestress.

8. A lock nut assembly as claimed in claim 2, wherein the threads are formed on the internal bore of the nut members.

9. A lock nut assembly as claimed in claim 2, wherein the threads are formed on the outer peripheral surface of said nut members.

* * * * *